US007349772B2

(12) United States Patent
Delaney et al.

(10) Patent No.: US 7,349,772 B2
(45) Date of Patent: Mar. 25, 2008

(54) VEHICLE INTEGRATED RADIO REMOTE CONTROL

(75) Inventors: Patrick M. Delaney, Fort Wayne, IN (US); Colin J. Casey, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 545 days.

(21) Appl. No.: 11/014,341

(22) Filed: Dec. 16, 2004

(65) Prior Publication Data

US 2006/0149442 A1 Jul. 6, 2006

(51) Int. Cl.
*G05D 1/00* (2006.01)

(52) U.S. Cl. .......... 701/2; 701/41

(58) Field of Classification Search .......... 701/24, 701/2, 41

See application file for complete search history.

(56) References Cited

U.S. PATENT DOCUMENTS 3,762,478 A * 10/1973 Cummins .......... 169/24
3,768,367 A * 10/1973 Fuzzell .......... 91/361
5,463,374 A 10/1995 Mendez et al.
5,646,845 A * 7/1997 Gudat et al. .......... 701/41
5,940,007 A 8/1999 Brinkmeyer et al.
5,975,162 A 11/1999 Link, Jr.
6,163,985 A 12/2000 Chinnery et al.
6,448,892 B1 9/2002 Delaporte
7,075,409 B2 * 7/2006 Guba .......... 340/5.21
2005/0085956 A1 * 4/2005 Losey .......... 701/2

FOREIGN PATENT DOCUMENTS

DE 197 20 123 A 1 7/1998
GB 2 240 418 A 7/1991

* cited by examiner

*Primary Examiner*—Mark Hellner
(74) *Attorney, Agent, or Firm*—Jeffrey P. Calfa; Gerald W. Askew

(57) ABSTRACT

Radio remote control over a motor vehicle and particularly of auxiliary systems installed on the vehicle is effected through an onboard controller which is integrated with the vehicle's controller area network. This arrangement increases flexibility of the system for handling different systems, and potentially more than one unrelated system.

6 Claims, 3 Drawing Sheets

VEHICLE INTEGRATED RADIO REMOTE CONTROL

BACKGROUND OF THE INVENTION

1. Technical Field

The invention relates to vehicle control and more particularly to control systems enabling both remote and vehicle mounted control of vehicle accessories and subsidiary systems such as aerial lifts, dump bodies, refuse compactors and concrete mixers.

2. Description of the Problem

Vehicle chassis are often called on to support operation of auxiliary systems such as aerial lifts, dump bodies, snowplows, wreckers, fluid delivery pumps, aircraft deicing equipment, refuse compactors and cement mixers. Typically these auxiliary systems require controls for operator input. In some cases the controls are simply switches or valves. Use of the controls can require the operator remain at a fixed location relative to or in the vehicle. While various remote systems allowing for operator mobility have been proposed, e.g. infrared, tethered, etc., radio has proved the most popular. An example of a system proposed for the radio remote control of a group of related systems either from controls installed on the vehicle or through a remote control device is Link, U.S. Pat. No. 5,975,162. Link proposed a system for a volatile liquid delivery vehicle which enabled remote control of power take off (PTO) for the liquid pump, of valves for control of delivery of the liquid, for transmission clutch control and for emergency shut down of the system.

Also well known are remote control devices for vehicle central locking systems and other specialized functions. Twelmeier et al., in German Patent Application DE 197 20 123 A1, recognized a tendency toward increasing multiplication of components as more and more onboard systems were provided with a remote controller, a receiver and on board control arrangements. Twelmeier et al. proposed a vehicle mounted system having a single receiver for receiving, demodulating, decoding and routing instructions from a plurality of different remote controllers to specific controllers for vehicle systems, e.g. to controllers for a central door locking control system and an for electric seat heating system.

Late 20$^{th}$ and early 21$^{st}$ century developments in motor vehicle control have moved toward placing major vehicle systems (e.g. engine, transmission, brakes) under a system controller and linking the system controllers to one another with a controller area network (CAN). The Society of Automotive Engineers (SAE) has published the J1939 standard which defines performance standards for controller area networks to be installed on motor vehicles and a protocol assuring smooth communication between controllers for major systems. The possibility of using a CAN for communication involving specialized systems using private or ad hoc signals is also provided for. The assignee of the present invention has developed vehicles incorporating two CANs, one linking the major controllers and a second, private CAN linking specialized devices which are not always, or even frequently, found across all vehicles of a class. For example, controllers for a power take off system for a utility vehicle may communicate using the private bus. Increased power demands by the power take off system may be coupled to the engine controller on the public bus through a electronic system controller (ESC)/body computer. Communication between the busses is effected by translation routines programmed into the ESC.

Unlicensed radio communication in the ISM (Industrial Scientific Medical) band set aside by the Federal Communications Commission has provided for considerable opportunity for new uses of radio below the maximum power outputs allowed by the FCC. The 2.4 MHZ to 2.5 MHZ band has proven particularly interesting. Commercial venders now provide a variety of equipment enabling two way communication using a wide variety of modulation schemes and frequency skipping techniques to improve bandwidth. Remote control applications of senders and receivers using the ISM bands and providing substantial bandwidth are increasingly popular.

It has been recognized that many of the auxiliary systems installed on vehicles, particularly commercial vehicles, are advantageously controlled remotely, or from both within or on the vehicle and remotely. Mechanical simplification of such systems promises greater flexibility in application and reduced hardware costs.

SUMMARY OF THE INVENTION

According to the invention there is provided a control system for a vehicle. A hand held or portable unit generates command signals which are communicated as messages over a radio link to a receiver installed on the vehicle. A data network installed on the vehicle passes the messages received from the hand held unit to the network for other controllers coupled to the network to detect. By appropriate programming the functionality of the user interface can be defined affording an operator the ability to pass messages on to the other controllers connected to the network. Multiple networks communicating through a gateway may be accommodated. Typically two networks are distinguished by whether messages on a particular network conform to an open, cross manufacturer standard, or whether the messages, while still conforming to the general J1939 protocol, have ad hoc meanings assigned to them by a particular manufacturer. Translation between the two major parts of the network is effected by an electrical system controller operating as the gateway between the networks. A third network segment connected to the electrical system controller may be provided for carrying status signals relating to individual switches.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
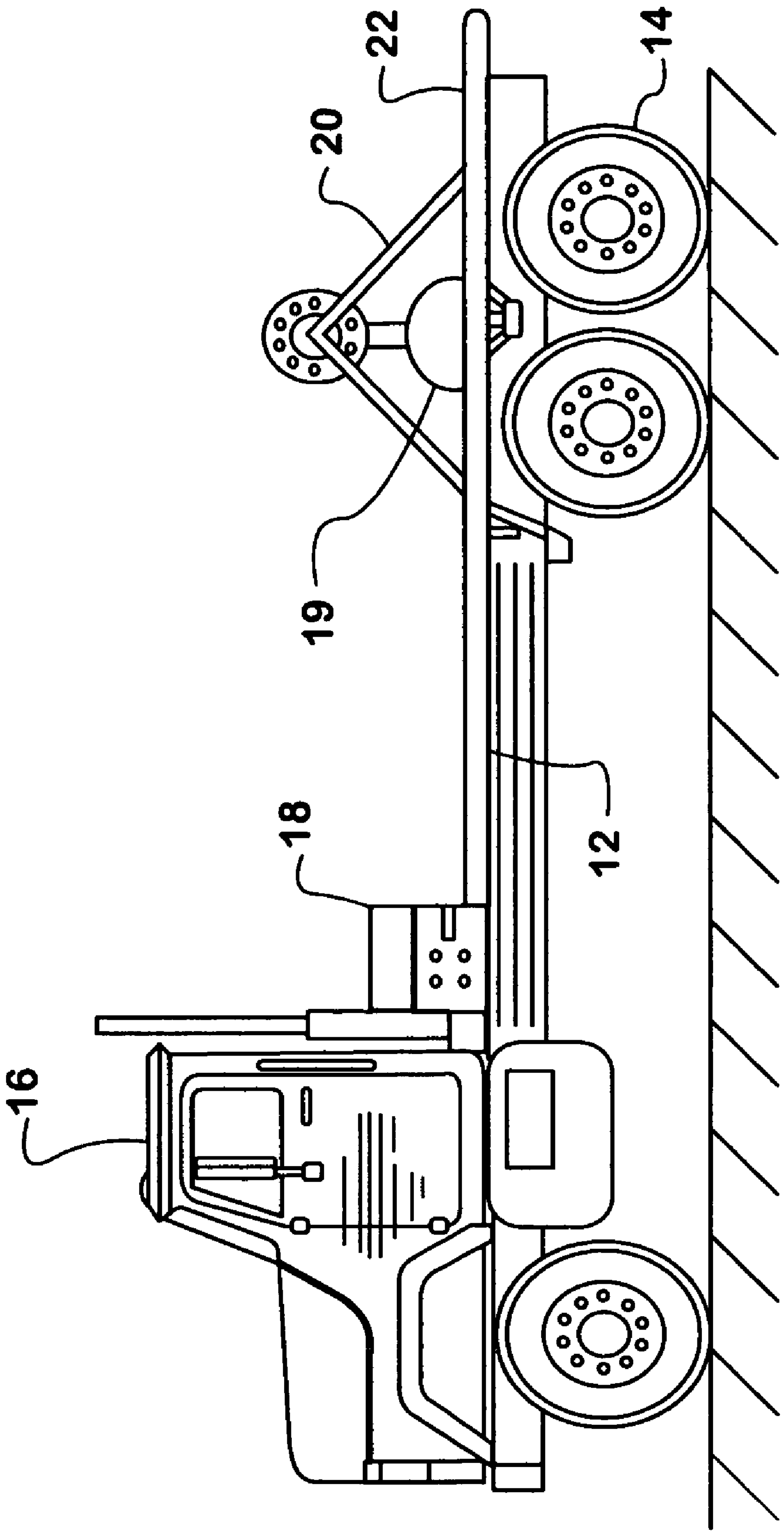
FIG. 1 is a side view of a truck with an auxiliary power take off system and with which the invention is advantageously employed.

Referring now to the figures and particularly to FIG. 1, a preferred embodiment of the invention will be described. In the figure a conventional flat bed truck 12 rides on a plurality of wheels 14. A driver usually controls the vehicle from a cab 16 positioned in the forward portion of the vehicle. An auxiliary system, here a winch 20, powered by an hydraulic pump driven in turn by the engine, is positioned on the flat bed 22 over the rear wheels. Auxiliary systems may of course take a number of forms, with the power take off type system exemplified here being used only for illustration. The winch 20 is controlled from a panel 18 mounted on the bed just behind cab 16 or by a handheld remote control unit 200, shown in FIG. 2. Panel 18 includes switches for selecting auto neutral and for requesting power take off operation to operate winch 20. The handheld unit 200 duplicates all of the functionality of the panel 18, and may be used for the control of other unrelated systems onboard truck 12. While it is contemplated that the invention be applied to vehicles having internal combustion engines, it is not restricted to such vehicles nor is it restricted to power take off systems.

Figure 2:
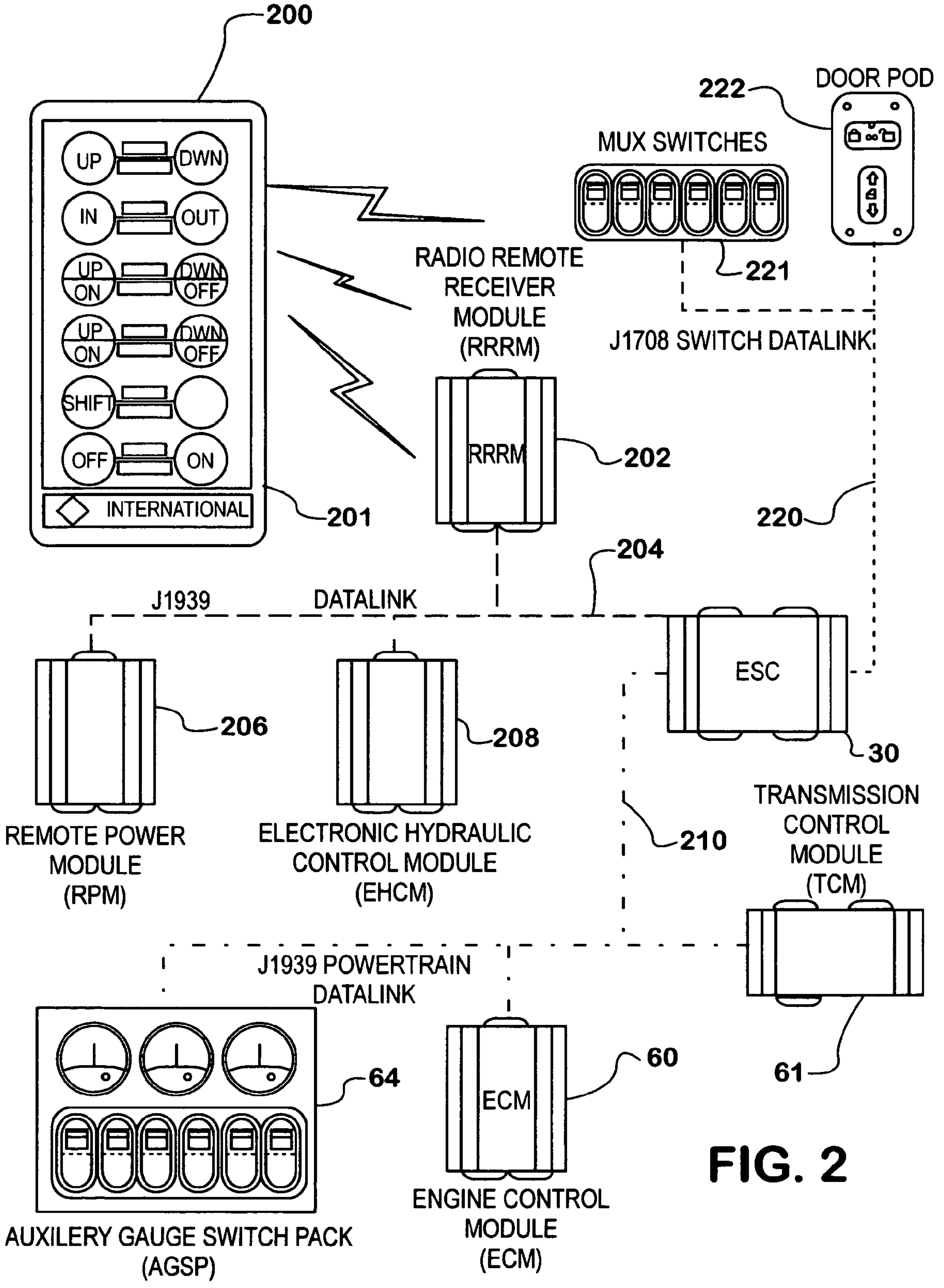
FIG. 2 is a block illustration of major components of the present invention.

Referring to FIG. 2, a high level block diagram illustrates major components of the present invention. A remote hand held transceiver 200 with a user interface 201 may be used by an operator remotely located with respect to a vehicle 12, on which are installed a number of subsidiary/auxiliary systems. Two way radio communication can be established between hand held transceiver 200 and a radio remote receiver module (RRRM) 202 which is attached to a SAE compliant J1939 CAN bus 204 which couples data between RRRM 202 and a remote power module (RPM) 206, an electronic hydraulic control module (EHCM) 208 and an electrical system controller (ESC) 30. Communication over CAN bus 204 a proprietary or ad hoc set of messages constructed in accordance with SAE J1939 standard. Programming of electrical system controller 30 may operate on these messages to generate messages for controllers connected to a second J1939 bus 210.

J1939 bus 210 provides a datalink between powertrain components and other essential vehicle systems, including an auxiliary gauge switch pack 64, an engine control module (ECM) 60 and a transmission control module (TCM) 61. ESC 30 is also coupled to J1939 bus 210.

Lastly, ESC 30 also receives low data rate communications over an SAE J1708 databus 220, which links the electrical system controller to a rack of multiplexed switches 221 and a door pod 222.

As can be seen generally from the foregoing description, a hand held controller generates command signals which are communicated by radio to a receiver installed on a vehicle. The receiver can communicate with other controllers over a data network installed on the vehicle. By appropriate programming the functionality of the hand held unit, its user interface can be defined to give an operator direct control over any vehicle system connected to the network. The data network itself is two networks, which are distinguished from one another by whether messages on the particular part conform to an open, cross manufacturer standard, or whether the messages, while still conforming to the general J1939 protocol, have ad hoc meanings assigned to them by a particular manufacturer. Translation between the two major parts of the network is effected by ESC 30, which is connected to both parts and functions as a gateway between the networks. A third network segment is a low data rate link which is essentially limited to status messages for individual switches. A particular system may or may not incorporate controls on the vehicle.

Figure 3:
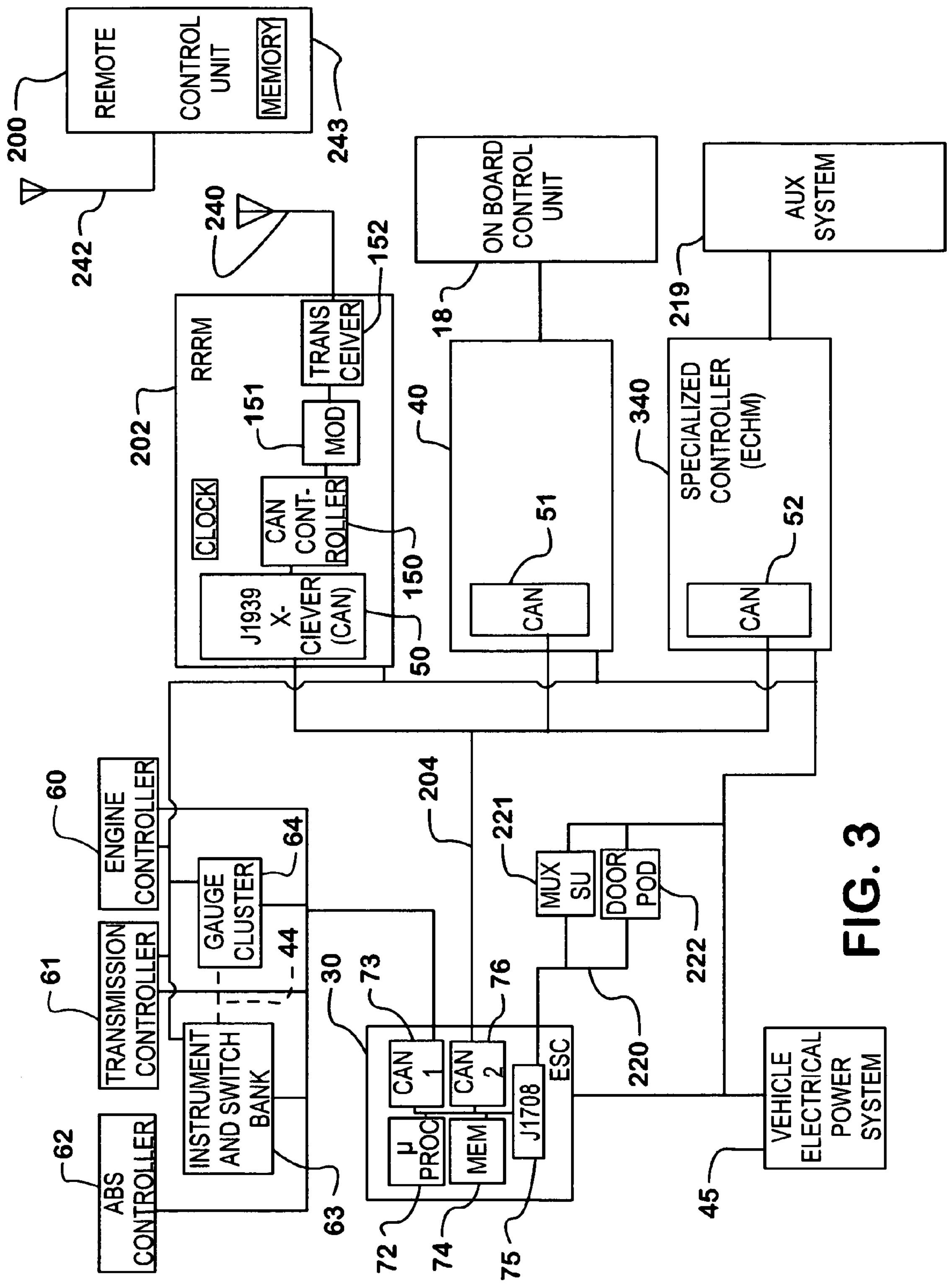
FIG. 3 is a block diagram of a control system according to the present invention.

FIG. 3 illustrates the control arrangements of the present invention in greater detail. ESC 30 may be seen to be essentially a programmable computer comprising a microprocessor 72 and memory 74 communicating over an internal bus. ESC 30 has three input/output (I/O) subsystems including a first CAN transceiver 73 coupled to CAN bus 210, a second CAN transceiver 76 coupled to CAN bus 204, and a J1708 transceiver 75 coupled to J1708 bus 220. The controllers for the major vehicle systems found on most motor vehicles are connected to CAN bus 210. These include an anti-lock brake system controller 62, a transmission controller/transmission control module 61, an engine controller/engine control module 60, an instrument and switch bank controller 63 and a gauge cluster/auxiliary gauge switch pack 64. Data transfer among these controllers and with ESC 30 occurs over CAN bus 210.

Specialized controllers installed on the vehicle to adapt it to a specialized purpose, e.g. a power take off application, are coupled to one another and to ESC 30 over the second CAN bus 204. RRRM 202 is treated as one of these specialized controllers and is connected to bus 204 for communication with any of the controllers connected to CAN bus 210 or to any of the controllers connected to CAN bus 204. Communications with controllers connected to CAN bus 210 is indirect and must be translated by, or invoke responses from, ESC 30. RRRM 202 comprises a J1939 CAN transceiver 50, a CAN controller 150, a modulator 151 and a transceiver unit 152, the last of which is connected to an antenna 240. RRRM 202 may be programmed to handle any security measures taken with signals between it and remote control unit 200. On the other hand, signals may be passed to ESC 30 for decoding, or to an onboard controller 340 for a specialized auxiliary system 219. Where remote control unit 200 is adapted for control of any system which is managed by an on board controller, it is anticipated that such security measures be handled by ESC 30. Handheld unit 200 has functionality defined by look up tables of code types stored in onboard memory 243. It maintains a radio link with RRRM 202 over an antenna 242. Handheld unit 200 may supplement, or duplicate, functions normally carried out through the instrument and switch bank 63, the gauge cluster 64, or those for an onboard control unit 18 which is associated with a CAN bus interface 51 and controller 40. In a typical application control is to be established over an auxiliary system 219, which in turn has a specialized controller 340 and CAN interface 52.

Electrical power for the diverse systems may be provided by a vehicle electrical power system 45 as shown.

The invention provides a controller area network solution allowing remote control over any system coupled to the network. This affords flexibility in that a remotely held controller may be adapted to any system by varying only its software package. In addition the system can be customized. Two way communication capability allows programming to be downloaded from a vehicle to a generic hand held unit or from the hand held unit to the chassis computer (i.e. ESC 30). Chassis information may be uploaded from the vehicle to the handheld unit for display.

While the invention is shown in only one of its forms, it is not thus limited but is susceptible to various changes and modifications without departing from the spirit and scope of the invention.

What is claimed is:

1. A control system for a motor vehicle comprising:

a portable unit for generating messages responsive to operator inputs and transmitting the messages within a radio signal;

a receiver installed on the motor vehicle for receiving the radio signal from the portable unit and for recovering the messages;

a data network installed on the motor vehicle connected to the receiver with the receiver being further adapted to pass the messages to the data network;

a plurality of controllers connected to the data network for receiving the messages with at least a first controller being programmed to respond thereto;

at least a first of the plurality of controllers being connected to a vehicle system for the control thereof;

means for formatting the messages for receipt and response by said at least first controller;

an electrical system controller connected to the data network, the electrical system controller being programmed to provide the means for formatting;

first and second data busses;

controllers for a first set of vehicle systems including an engine controller and a transmission controller being connected to the first data bus;

controllers bra set of auxiliary systems, including the receiver, being connected to the second data bus; and the electrical system controller being connected to both the first and the second bus with the means for formatting providing for generating messages on the first bus in response to receipt of messages from the second bus.

2. A control system for a motor vehicle as claimed in claim 1, further comprising:

an auxiliary control unit installed on the vehicle;

a controller connecting the auxiliary control unit to the second bus; and the auxiliary control unit and the portable unit being programmed to invoke identical functionality.

3. A control system for a motor vehicle as claimed in claim 1, further comprising:

the portable unit having a user interface including controls, display capability and memory; and the electrical system controller being programmed to transfer data to the portable unit for defining the functionality of the portable unit.

4. A control system for a motor vehicle as claimed in claim 3, further comprising:

the electrical system controller and the first and second data busses supporting first and second controller area networks.

5. A control system for a motor vehicle as claimed in claim 4, further comprising:

a plurality of switches;

a third network segment connected to the electrical system controller for carrying status signals relating to the plurality of switches.

6. Apparatus comprising:

a motor vehicle;

a motor vehicle control system including first and second controller area networks and a programmable electrical system controller connected to both the first and second controller area networks;

a plurality of system controllers connected to the first controller area network including an engine controller and a transmission controller;

a plurality of auxiliary modules connected to the second controller area network including a radio remote receiver module;

a radio remote control unit having a user interface for transmitting control signals for receipt by the radio remote receiver module;

means for the placing the control messages on the second controller area network;

the electrical system controller being further programmed to respond to control signals received on the second controller area network for generating control signals for and transmitting control signals on the first controller area network;

the radio remote receiver module providing two way communication with the radio remote control unit;

the radio remote control unit including memory allowing its functionality to be defined by changes in programming stored in memory;

a plurality of switches connected to the electrical system controller;

a switch status bus connected between the plurality of switches and the electrical system controller; and the electrical system controller being programmed to respond to command signals received over the second controller area network as it would signals indicating the status of the plurality of switches.

* * * * *